(12) United States Patent  
Barwicz

(10) Patent No.: US 8,604,574 B2
(45) Date of Patent: Dec. 10, 2013

(54) TRANSPARENT PHOTODETECTOR

(75) Inventor: Tymon Barwicz, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 13/099,827

(22) Filed: May 3, 2011

(65) Prior Publication Data

US 2012/0280203 A1    Nov. 8, 2012

(51) Int. Cl.
*H01L 27/14* (2006.01)
*H01L 31/0232* (2006.01)

(52) U.S. Cl.
USPC ........... 257/431; 257/414; 257/415; 257/428; 257/432; 257/E23.001; 250/231.1; 250/231.19; 73/649; 73/653; 73/514.33; 73/514.32; 73/514.26

(58) Field of Classification Search
USPC .......... 257/414, 415, E23.001, 431, 432, 428; 250/231.1, 231.19; 73/649, 653, 760, 73/789, 800, 514.33, 514.34, 514.26
See application file for complete search history.

(56) References Cited

U.S. PATENT DOCUMENTS

| 7,302,856 | B2 | 12/2007 | Tang et al. |
| 7,437,938 | B2 | 10/2008 | Chakraborty |
| 7,720,326 | B2 | 5/2010 | Wu et al. |
| 2003/0086647 | A1 | 5/2003 | Willner et al. |
| 2008/0181551 | A1 | 7/2008 | Wang et al. |
| 2008/0314148 | A1* | 12/2008 | Robert ........................ 73/514.33 |
| 2009/0231651 | A1 | 9/2009 | Roichman et al. |
| 2010/0180354 | A1 | 7/2010 | Degertekin |
| 2010/0295019 | A1 | 11/2010 | Wang et al. |
| 2010/0320444 | A1 | 12/2010 | Dutta |
| 2011/0001124 | A1 | 1/2011 | Ahn |
| 2012/0007052 | A1* | 1/2012 | Hobbs et al. ................ 257/24 |

FOREIGN PATENT DOCUMENTS

WO    WO2009125014    10/2009

OTHER PUBLICATIONS

Li et al. Harnessing optical forces in integrated photonic circuits. Letters to Macmillan Publishers Limited, vol. 456, 2008, pp. 480-484.*
Barwicz et al. Silicon nanowire piezoresistance: Impact of surface crystallographic orientation. Applied Physics Letters, 97, 023110 (2010).*
Tang, Photonic Breakthorugh for Silicon Chips. Provided by the Applicant and contained in a wrap folder for Prior Art for U.S. Appl. No. 13/099,827. Published online, 2009.*
Prosecution history for PCT Patent Application PCT/US12/35816, International Search Report and Written Opinion, mail date of Aug. 10, 2012.

(Continued)

*Primary Examiner* — Cuong Q Nguyen
*Assistant Examiner* — Galina Yushina
(74) *Attorney, Agent, or Firm* — Law Offices of Ira D. Blecker, P.C.

(57) ABSTRACT

The transparent photodetector includes a substrate; a waveguide on the substrate; a displaceable structure that can be displaced with respect to the substrate, the displaceable structure in proximity to the waveguide; and a silicon nanowire array suspended with respect to the substrate and mechanically linked to the displaceable structure, the silicon nanowire array comprising a plurality of silicon nanowires having piezoresistance. In operation, a light source propagating through the waveguide results in an optical force on the displaceable structure which further results in a strain on the nanowires to cause a change in electrical resistance of the nanowires. The substrate may be a semiconductor on insulator substrate.

18 Claims, 7 Drawing Sheets

(56) References Cited

OTHER PUBLICATIONS

H. X. Tang, "Photonics Breakthrough for Silicon Chips," IEEE Spectrum. Oct. 2009, online, http://spectrum.ieee.org/semiconductors/devices/photonics-breakthrough-for-silicon-chips/0.

W. H. P. Pernice et al, "Theoretical investigation of the transverse optical force between a silicon nanowire waveguide and a substrate," Optics Express, vol. 17, No. 3, 2009, pp. 1806-1816.

M. Li et al., "Harnessing optical forces in integrated photonic circuits," Nature, vol. 456, 2008, pp. 480-484.

J. Roels et al., "Tunable optical forces between nanophotonic waveguides," Nature Nanotechnology vol. 4, Published online Jul. 13, 2009, pp. 510-513.

G. S. Wiederhecker et al., "Controlling photonic structures using optical forces," Nature, vol. 462, Published online Nov. 15, 2009 pp. 633-636.

* cited by examiner

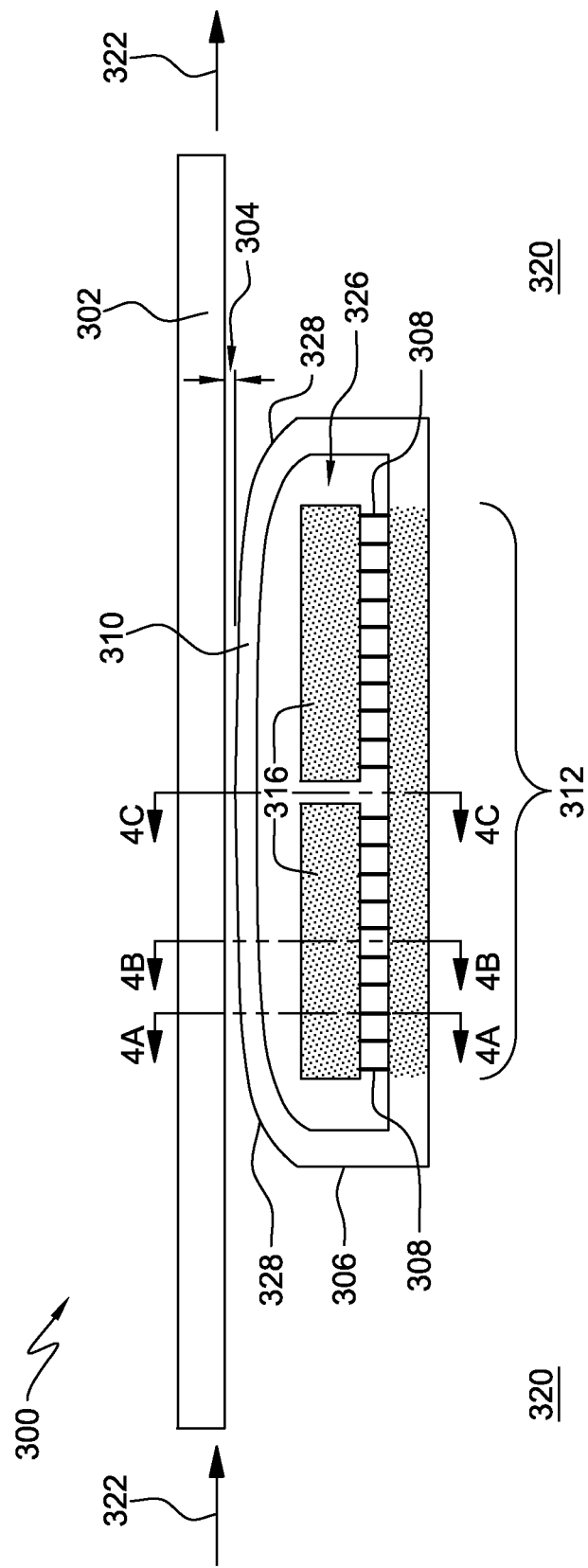

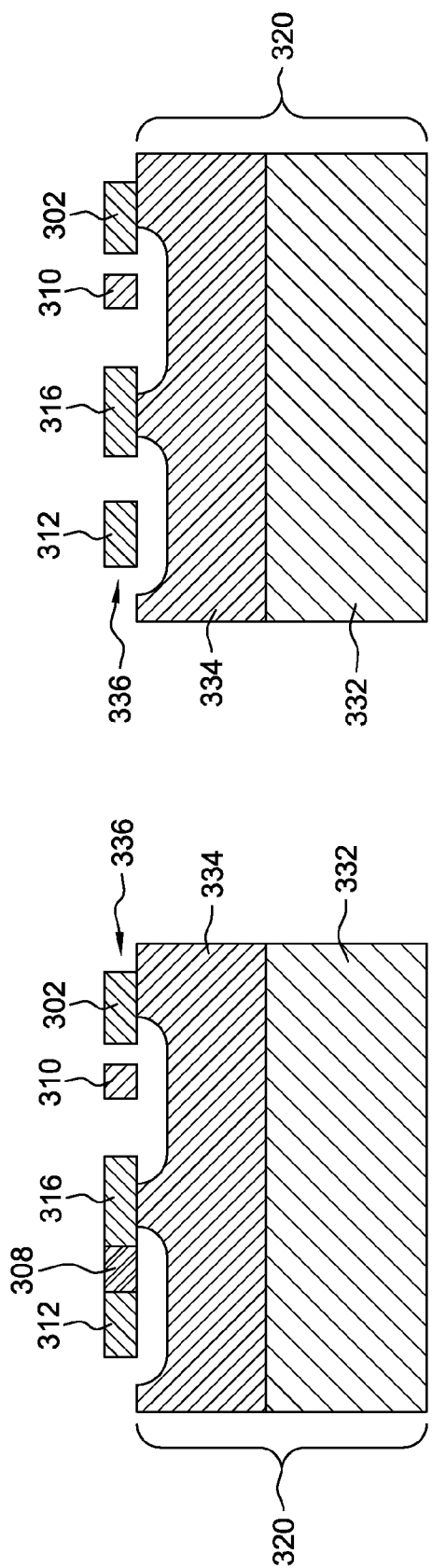
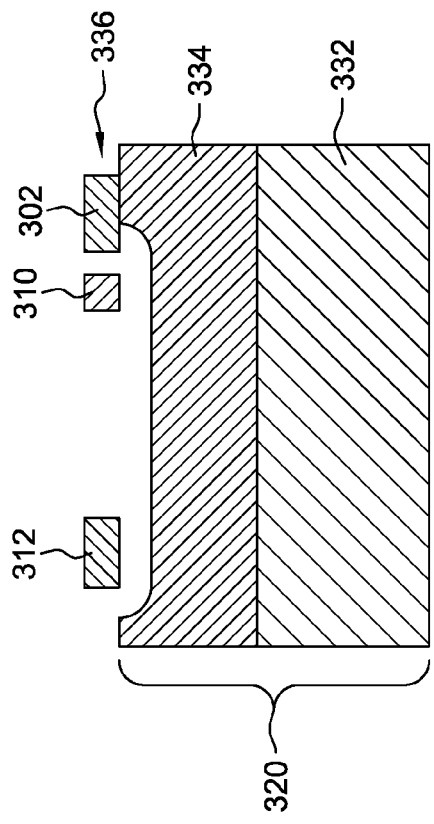
FIG. 4A
FIG. 4B
FIG. 4C

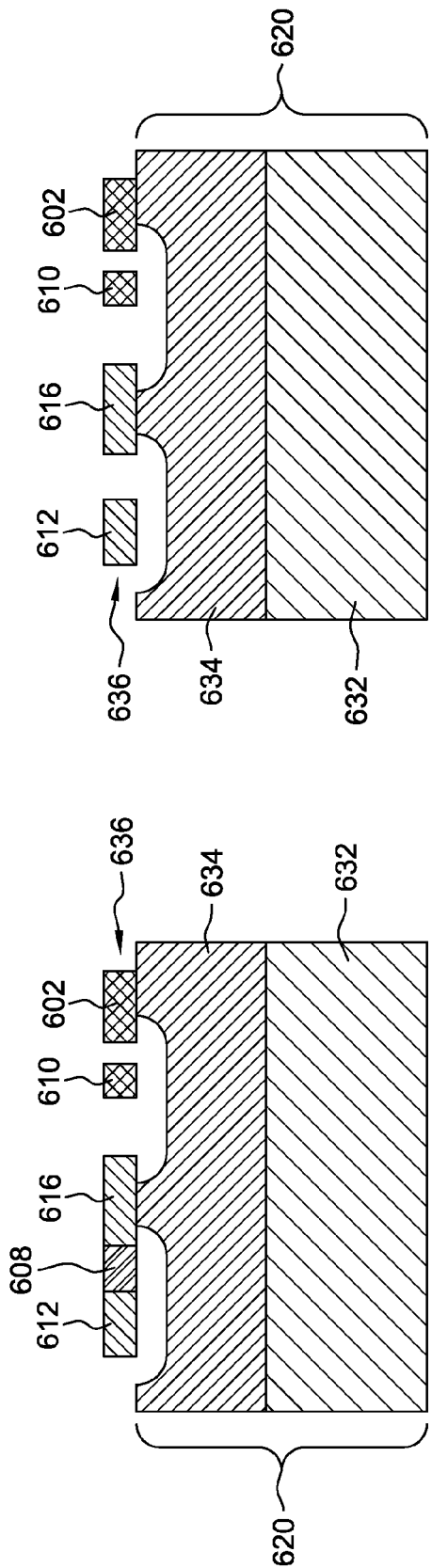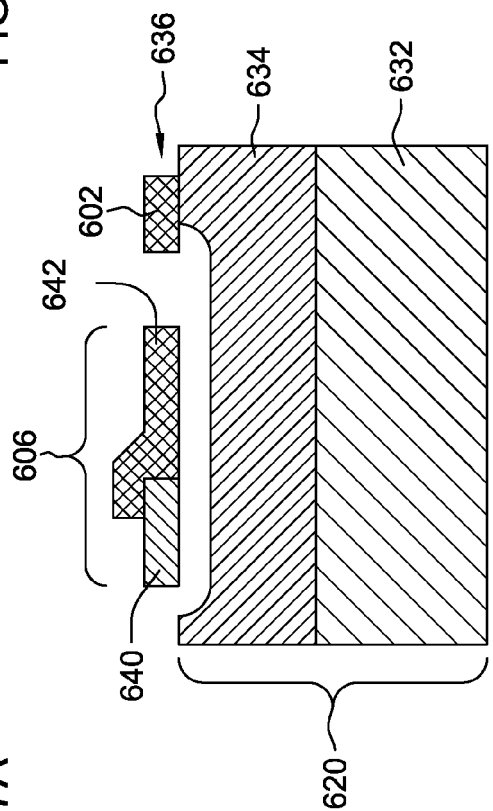
FIG. 7A
FIG. 7B
FIG. 7C

TRANSPARENT PHOTODETECTOR

BACKGROUND

The exemplary embodiments relate to sensing devices and, more particularly relate to photodetectors which can detect light with only negligible absorption of photons.

Photodetectors are devices that translate light intensity into an electric signal. Photodetectors are widely used in optical communication systems from remote controls to fiber optic communication. Most photodetectors are semiconductor p-i-n junctions working on the principle of photon-induced carrier generation. Photons of energy larger than the semiconductor bandgap are absorbed by the semiconductor material. The absorption generates electron-hole pairs that are then detected by measuring the resulting current.

BRIEF SUMMARY

The various advantages and, purposes of the exemplary embodiments as described above and hereafter are achieved by providing, according to a first aspect of the exemplary embodiments, a transparent photodetector. The transparent photodetector includes a substrate; a waveguide on the substrate; a displaceable structure that can move with respect to the substrate and is in proximity to the waveguide; and a silicon nanowire array suspended with respect to the substrate and mechanically linked to the displaceable structure, the silicon nanowire array comprising a plurality of silicon nanowires having piezoresistance. In operation, light propagating in the waveguide results in an optical force on the displaceable structure which further results in a strain on the nanowires to cause a change in electrical resistance of the nanowires.

According to a second aspect of the exemplary embodiments, there is provided a transparent photodetector. The transparent photodetector includes a silicon on insulator (SOI) substrate comprising a semiconductor on insulator (SOI) layer, an oxide layer, and a base; a waveguide formed in the SOI layer; a displaceable structure in proximity to the waveguide, the displaceable structure formed in the SOI layer with the oxide layer removed from underneath the displaceable structure so that the displaceable structure is suspended with respect to the SOI substrate; and a silicon nanowire array in the SOI layer suspended with respect to the base by the removal of the oxide layer underneath the silicon nanowire array and mechanically linked to the displaceable structure, the silicon nanowire array comprising a plurality of silicon nanowires having piezoresistance. In operation, a light source propagating through the waveguide results in an optical force on the displaceable structure which further results in a strain on the nanowires to cause a change in electrical resistance of the nanowires.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 3 is a top view of an implementation of a first exemplary embodiment.

FIGS. 4A, 4B and 4C are cross sectional views of FIG. 3 along the lines 4A-4A, 4B-4B and 4C-4C.

FIGS. 7A, 7B and 7C are cross sectional views of FIG. 6 along the lines 7A-7A, 7B-7B and 7C-7C.

DETAILED DESCRIPTION

There is proposed a transparent photodetector in which there is a device capable of detecting light with negligible absorption of photons. The proposed device does not rely on carrier generation in semiconductors. Rather, the proposed device relies on optical forces and the large piezoresistance coefficient of silicon nanowires for detection of light.

The proposed transparent photodetector includes at least one waveguide, at least one displaceable structure in proximity to the waveguide and at least one silicon nanowire array mechanically linked to the displaceable structure. A silicon nanowire array means at least two nanowires.

Light propagating in the waveguide results in an optical force on the displaceable structure that is in proximity to the waveguide. The optical force may be attractive or repulsive. The applied optical force results in a strain on the nanowire array. The strain in the nanowire array changes the resistance of the nanowires through the enhanced piezoresistance effect in silicon nanowires. The change of resistance can be detected by applying a voltage and measuring the output current. The output current will be related to the power of the optical signal in the waveguide.

The piezoresistive effect describes the changing resistivity of a semiconductor due to applied mechanical strain. The piezoresistive effect differs from the piezoelectric effect. In contrast to the piezoelectric effect, the piezoresistive effect only causes a change in electrical resistance; it does not produce an electric potential. The piezoresistive effect of semiconductor materials can be several orders of magnitude larger than the geometrical effect in metals and is present in materials like germanium, polycrystalline silicon, amorphous silicon, silicon carbide, and single crystal silicon.

The proposed transparent photodetector is deemed transparent as only a negligible number of photons may be absorbed for the intensity of the optical signal to be measured. Non-negligible optical losses in the structure, which do not contribute to the detection mechanism, may occur from spurious scattering and material absorption. However, these optical losses may be maintained at a negligible level as well by design of the transparent photodetector.

Figure 1:
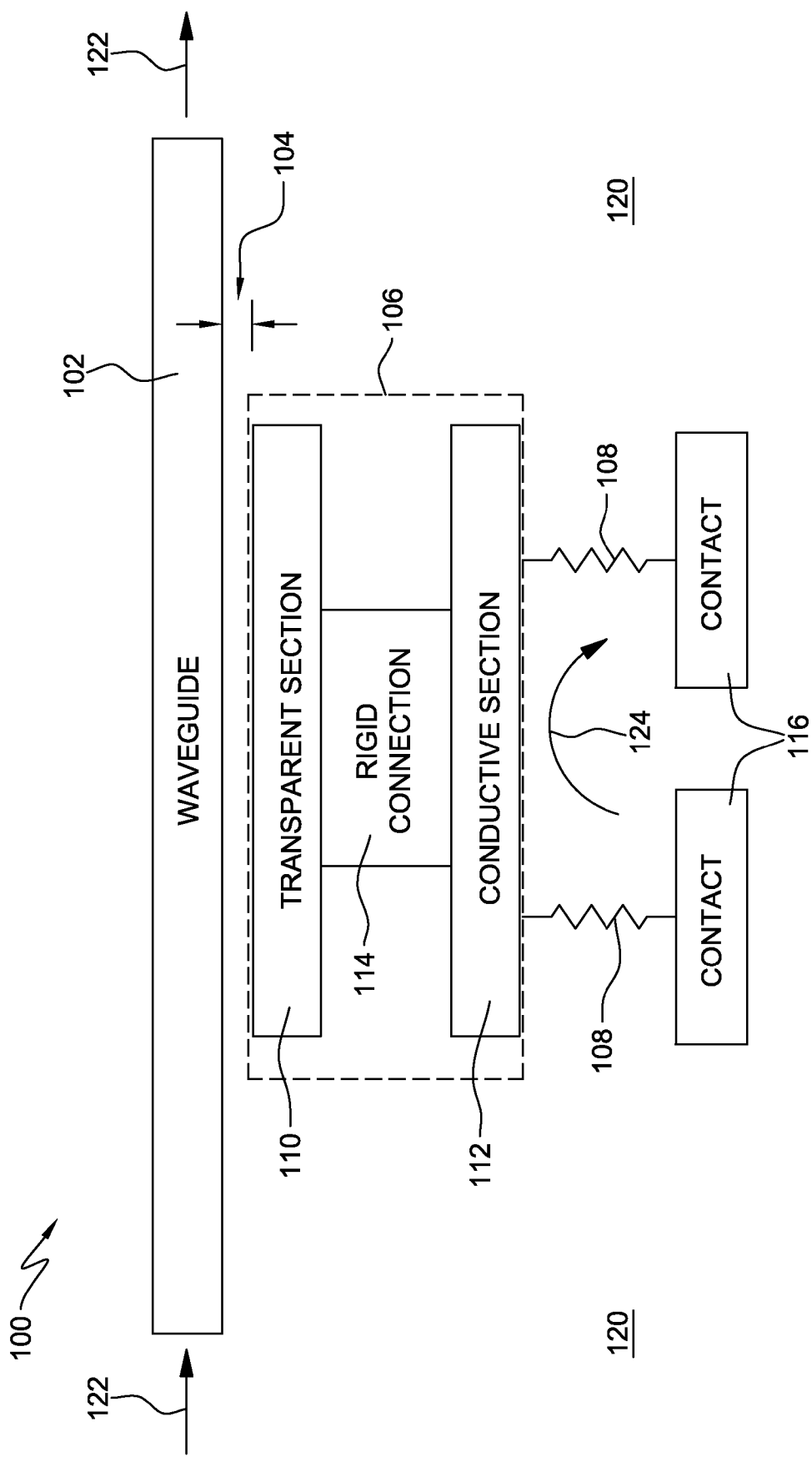
FIG. 1 is a top view of a first functional exemplary embodiment.

Referring to the Figures in more detail, and particularly referring to FIG. 1, there is shown a first functional exemplary embodiment of a transparent photodetector 100. The transparent photodetector 100 includes a waveguide 102 in close proximity 104 to a displaceable structure 106. Connected to displaceable structure 106 is a silicon nanowire array 108.

A nanowire array may be defined as an array of nanowires with each nanowire having a width and/or height on the order of 5 to 500 nanometers, preferably below 150 nanometers, and a length of 5 to 5000 nanometers, preferably below 500 nanometers.

The displaceable structure 106 may include a transparent section 110 and a conductive section 112. The transparent section 110 and conductive section 112 are shown in FIG. 1 as separate, elements connected by a rigid connection 114. However, it is within the scope of the present invention for the transparent section 110 to be adjacent to the conductive section 112 or even for the transparent section 110 and conductive section 112 to be combined into a single element having both the functions of transparency and conductivity.

The silicon nanowire array 108 is electrically connected to the conductive section 112 of the transparent beam 106. The transparent photodetector 100 may also include contacts 116 which also may make electrical contact with the silicon nanowire array 108.

The proximity 104 of the displaceable structure 106 and the waveguide 102 is dependent on the wavelength of the light traveling in the waveguide, the index of refraction of the transparent section 110 and other factors. The optimal proximity can be readily determined by a person skilled in the art following the teachings of the present invention.

The transparent photodetector 100 may be fabricated on a suitable substrate 120 such as a semiconductor wafer. The displaceable structure 106 and silicon nanowire array 108 are "suspended" with respect to the substrate 120. By suspended, it is meant that the displaceable structure 106 and silicon nanowire array 108 do not make direct physical contact with the underlying substrate 120. The waveguide 102 and contacts 116 are not suspended which means that the waveguide 102 and contacts 116 do make direct physical contact with the underlying substrate 120.

In operation, a light 122 is caused to travel through the waveguide 102 to transparent section 110 of the transparent beam 106. In this exemplary embodiment, the traveling light 122 causes a force on the displaceable structure 106 which in turn causes a strain on the silicon nanowire array 108. Due to the enhanced piezoelectric effect in the silicon nanowire array 108, the change in resistance of the silicon nanowire array 108 may be measured by applying a voltage and measuring the output current 124. The output current 124 will be related to the power of the traveling light 122 in the waveguide 102. Thus, the transparent photodetector 100 may be used as a photodetector.

Figure 2:
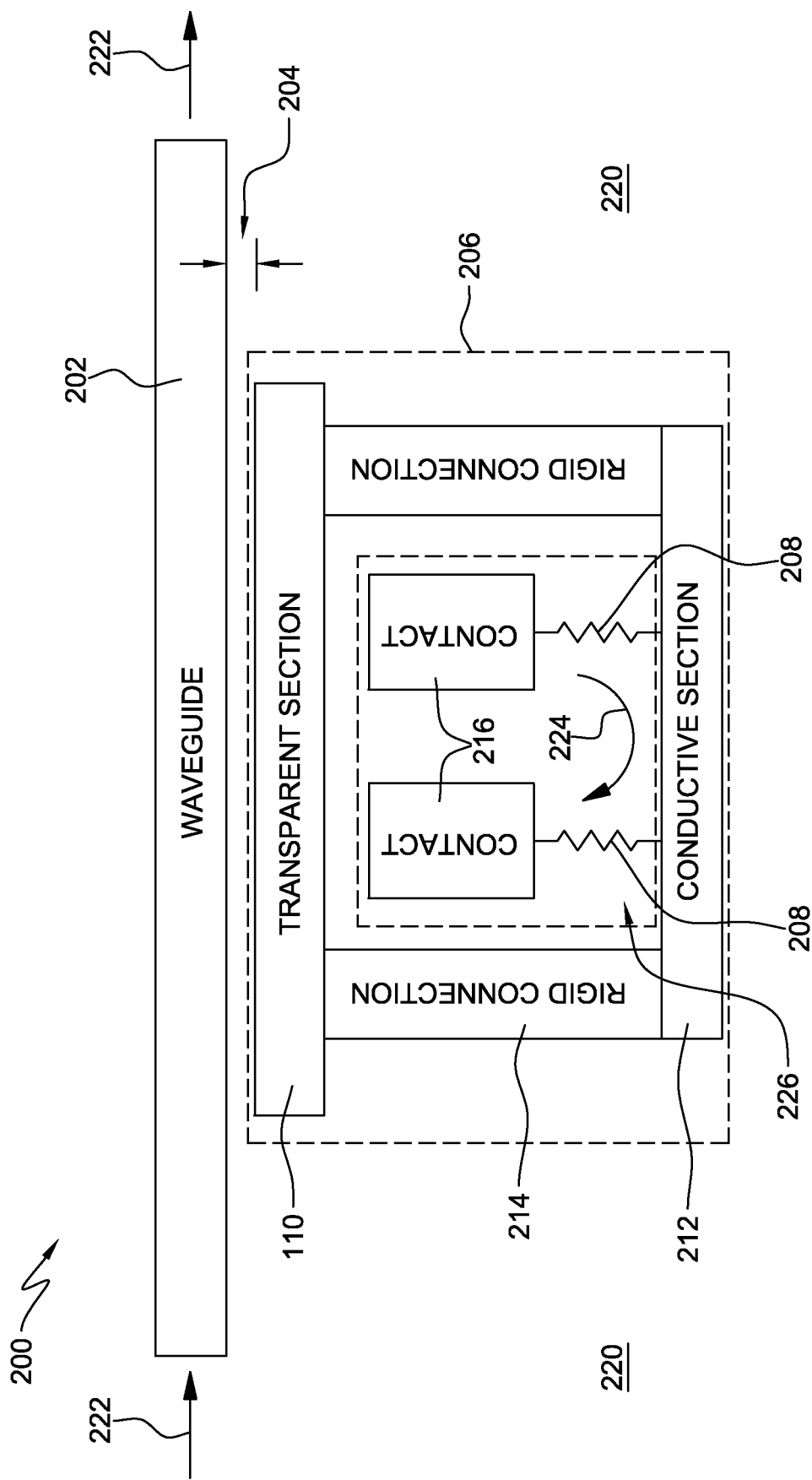
FIG. 2 is a top view of a second functional exemplary embodiment.

Referring now to FIG. 2, there is shown a second functional exemplary embodiment of a transparent photodetector 200. The transparent photodetector 200 includes a waveguide 202 in close, proximity 204 to a displaceable structure 206. Connected to the displaceable structure 206 is a silicon nanowire array 208.

The displaceable structure 206 may include a transparent section 210 and a conductive section 212. The transparent section 210 and conductive section 212 are shown in FIG. 2 as separate elements connected by a rigid connection 214. However, it is within the scope of the present invention for the transparent section 210 to be adjacent to the conductive section 212 or even for the transparent section 210 and conductive section 212 to be combined into a single element having both the functions of transparency and conductivity.

The silicon nanowire array 208 is electrically connected to the conductive section 212 of the displaceable structure 206. The transparent photodetector 200 may also include contacts 216 which also may make electrical contact with the silicon nanowire array 208. It is noted that in the exemplary transparent photodetector 200, the nanowire array will be put into a compressive strain if the optical force is attractive. This will maximize the detectivity of the photodetector in the case of an attractive optical force and a stronger silicon nanowire piezoresistance in the compressive nanowire regime than in the tensile nanowire regime.

As noted above, the proximity 204 of the displaceable structure 206 and the waveguide 202 is dependent on the wavelength of the light traveling in the waveguide, the index of refraction of the transparent section 210 and other factors and can be readily determined by a person skilled in the art following the teachings of the present invention.

The transparent photodetector 200 may be fabricated on a suitable substrate 220 such as a semiconductor wafer. The displaceable structure 206 and silicon nanowire array 208 are suspended (as defined above) with respect to the substrate 220. The waveguide 202 and contacts 216 are not suspended.

In operation, a light 222 is caused to travel through the waveguide 202 to transparent section 210 of the displaceable structure 206. In this exemplary embodiment, the traveling light 222 causes an attractive force on the displaceable structure 206 which in turn causes a strain on the silicon nanowire array 208. Due to the enhanced piezoelectric effect in the silicon nanowire array 208, the change in resistance of the silicon nanowire array 208 may be measured by applying a voltage and measuring the output current 224. The output current 224 will be related to the power of the traveling light 222 in the waveguide 202. Thus, the transparent photodetector 200 may be used as a photodetector.

A first implementation of an exemplary embodiment of a transparent photodetector 300 is illustrated in FIG. 3. Transparent photodetector 300 may be implemented in a semiconductor on insulator (SOI) substrate 320. SOI substrate 320 may include a top layer of silicon (also called SOI layer) which may also be a silicon-germanium or silicon-carbon alloy and may include one or more dopants selected from the group consisting of germanium, arsenic, phosphorus, boron, antimony and carbon. The transparent photodetector 300 may be formed in the SOI layer. Underneath the top SOI layer is an insulator such as oxide. The oxide insulator layer may also be called a buried oxide layer or BOX layer. On the bottom is the base substrate which is usually silicon and often referred to as the handle.

The transparent photodetector 300 includes a waveguide 302 in close proximity 304 to a displaceable structure 306.

The displaceable structure 306 may include a transparent section 310 and a conductive section 312. The transparent section 310 and conductive section 312 are shown in FIG. 3 as distinct although they may be combined into a single section if the material employed can be both transparent and conductive in the same area. The transparent section 310 may have smooth transitions 328 to avoid scattering of light traveling through the waveguide 302. Connected to the displaceable structure 306 and electrically connected to conductive section 312 are silicon nanowire arrays 308. Each nanowire may have at least one undoped or low-doped segment along its length. Undoped and low doped silicon can show larger piezoresistance than heavily doped silicon. The transparent section 310 may be undoped to be highly transparent to light while the conductive section 312 is highly doped to offer a negligible electrical resistance when compared to the resistance of the nanowire array. The conductive section 312 is shaded to indicate that it is doped. For a structure made of silicon or a silicon-germanium or silicon-carbon alloy, dopants may include boron, phosphorous, antimony and arsenic. The required doping of the low doping region (e.g., for the nanowires) and high doping region (e.g., for the conductive section) will be a function of the exact dimensions of the device and the wavelength of light used. As a rule of thumb, if single-crystal silicon is used to define the transparent photodetector 300, the highly doped region may exhibit a resistivity between 0.001 Ohm·cm and 1 Ohm·cm while the low-doped and undoped region may exhibit a resistivity of 0.1 Ohm·cm to 100 Ohm·cm.

The transparent photodetector 300 may also include contacts 316 which also may make electrical contact with the silicon nanowire arrays 308. The contacts 316 may also be doped similarly to the conductive section 312. The contacts 316 are shaded to indicate that they may be doped. It is noted that in the exemplary transparent photodetector 300, the silicon nanowires are oriented such as an attractive optical force will create a compressive strain on the nanowire. This will maximize the detectivity of the transparent photodetector if an attractive optical force is expected and piezoresistance of the silicon nanowires is larger in the compressive than in the tensile regime.

As noted above, the proximity 304 of the displaceable structure 306 and the waveguide 302 is dependent on the wavelength of the light traveling in the waveguide, the index of refraction of the transparent section 310 and other factors and can be readily determined by a person skilled in the art following the teachings of the present invention.

The transparent photodetector 300 may be fabricated on an SOI substrate 320 as indicated above. FIGS. 4A, 4B and 4C are various cross sections of transparent photodetector 300 as indicated by arrows 4A-4A, 4B-4B and 4C-4C in FIG. 3. Referring first to FIG. 4A, this is a section through the conductive section 312, nanowire array 308, contacts 316, transparent section 310 and waveguide 302. FIG. 4B is a section through the conductive section 312, contacts 316, transparent section 310 and waveguide 302 while FIG. 4C is a section through the conductive section 312, transparent section 310 and waveguide 302. SOI substrate 320 includes the base substrate 332, BOX layer 334 and SOI layer 336. The displaceable section 306, including transparent section 310 and conductive section 312, and silicon nanowire arrays 308 may be suspended by removing the BOX layer 334 underneath the SOI layer 336. The displaceable section 306 and silicon nanowire arrays 308 are indirectly connected to the substrate 320 through contacts 316 which make direct physical contact with BOX layer 334. The waveguide 302 is also not suspended and is directly physically connected to the substrate 320 at BOX layer 334.

In operation, a light 322 is caused to travel through the waveguide 302 and interact with the transparent section 310 of the displaceable structure 306. In this exemplary embodiment, the traveling light 322 causes a force on the displaceable structure 306 which in turn causes a strain on the silicon nanowire arrays 308. Due to the enhanced piezoelectric effect in the silicon nanowire arrays 308, the change in resistance of the silicon nanowire arrays 308 may be measured by applying a voltage and measuring the output current. In this exemplary embodiment, the current may be measured between two contacts 316 as it passes through the nanowire arrays 308 and conductive section 312. The output current will be related to the intensity of the traveling light 322 in the waveguide 302. Thus, the transparent photodetector 300 may be used as a photodetector.

Figure 5:
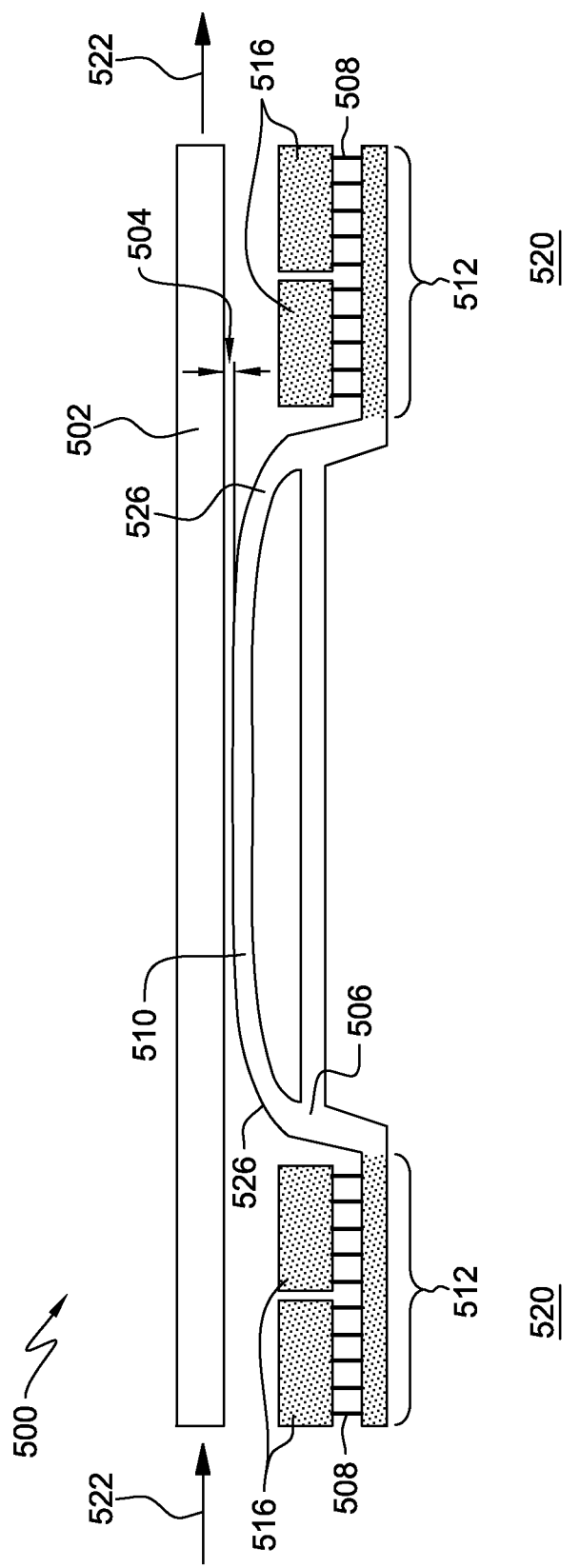
FIG. 5 is a top view of an implementation of a second exemplary embodiment.

A second implementation of an exemplary embodiment of a transparent photodetector 500 is illustrated in FIG. 5. Transparent photodetector 500 may be implemented in a semiconductor on insulator (SOI) substrate 520 as described previously with respect to FIG. 3.

The transparent photodetector 500 includes a waveguide 502 in close proximity 504 to a displaceable structure 506.

The displaceable structure 506 may include a transparent section 510 and two conductive sections 512, one conductive section 512 on each side of the transparent section 510. The transparent section 510 and conductive sections 512 are shown in FIG. 5 as distinct elements although they are connected and may be combined into a single section if the material employed can be both transparent and conductive in the same area. The transparent section 510 may have smooth transitions 526 to avoid scattering of light traveling through the waveguide 502. Connected to the displaceable structure 506 and electrically connected to conductive sections 512 are silicon nanowire arrays 508. Each nanowire may have at least one undoped or low-doped segment along its length to allow for large piezoresistance. The transparent section 510 may be undoped to be highly transparent to light while the conductive sections 512 are doped to offer a negligible electrical resistance when compared to the resistance of the nanowire array. The conductive section is shaded to indicate that it may be doped.

The transparent photodetector 500 may also include contacts 516 which also may make electrical contact with the silicon nanowire arrays 508. The contacts 516 may also be doped. The contacts 516 are shaded to indicate that they may be doped.

As noted above, the proximity 504 of the displaceable structure 506 and the waveguide 502 is dependent on the wavelength of the light traveling in the waveguide, the index of refraction of the transparent section 510 and other factors and can be readily determined by a person skilled in the art following the teachings of the present invention.

The transparent photodetector 500 may be fabricated on an SOI substrate 520 as indicated above. The displaceable structure 506 and silicon nanowire arrays 508 may be suspended by removing the oxide layer underneath the SOI layer similarly to that shown in FIGS. 4A-4C. The displaceable structure 506 and silicon nanowire arrays 508 are indirectly connected to the substrate 520 through contacts 516. The waveguide 502 is also not suspended and is directly physically connected to the substrate 520.

In operation, a light 522 is caused to travel through the waveguide 502 and interact with the transparent section 510 of the displaceable structure 506. In this exemplary embodiment, the traveling light 522 causes a force on the displaceable structure 506 which in turn causes a strain on the silicon nanowire arrays 508. Due to the enhanced piezoelectric effect in the silicon nanowire arrays 508, the change in resistance of the silicon nanowire arrays 508 may be measured by applying a voltage and measuring the output current. In this exemplary embodiment, the current may be measured between two contacts of each set of contacts. The output current will be related to the power of the traveling light 522 in the waveguide 502. Thus, the transparent photodetector 500 may be used as a photodetector.

The exemplary embodiment of FIG. 5 mainly differs from the embodiment shown in FIG. 3 by the placement of the contacts. In both embodiments, the silicon nanowires are oriented such as an attractive optical force will result in a compressive strain on the nanowire. The preferred embodiment will depend on the required contact size, nanowire array size, and the required length of optical interaction between the waveguide and the transparent section. These parameters can be established by a person of skill in the art based on the desired detectivity of the photodetector, the desired bandwidth of the photodetector and the fabrication process used. For situations where the contacts or the nanowire arrays need to be larger than the desired length of optical interaction between the waveguide and the transparent section, the embodiment of FIG. 5 may be preferred. For situations where the contacts or the nanowire arrays can be smaller than the desired length of optical interaction between the waveguide and the transparent section, the embodiment of FIG. 3 may be preferred.

Figure 6:
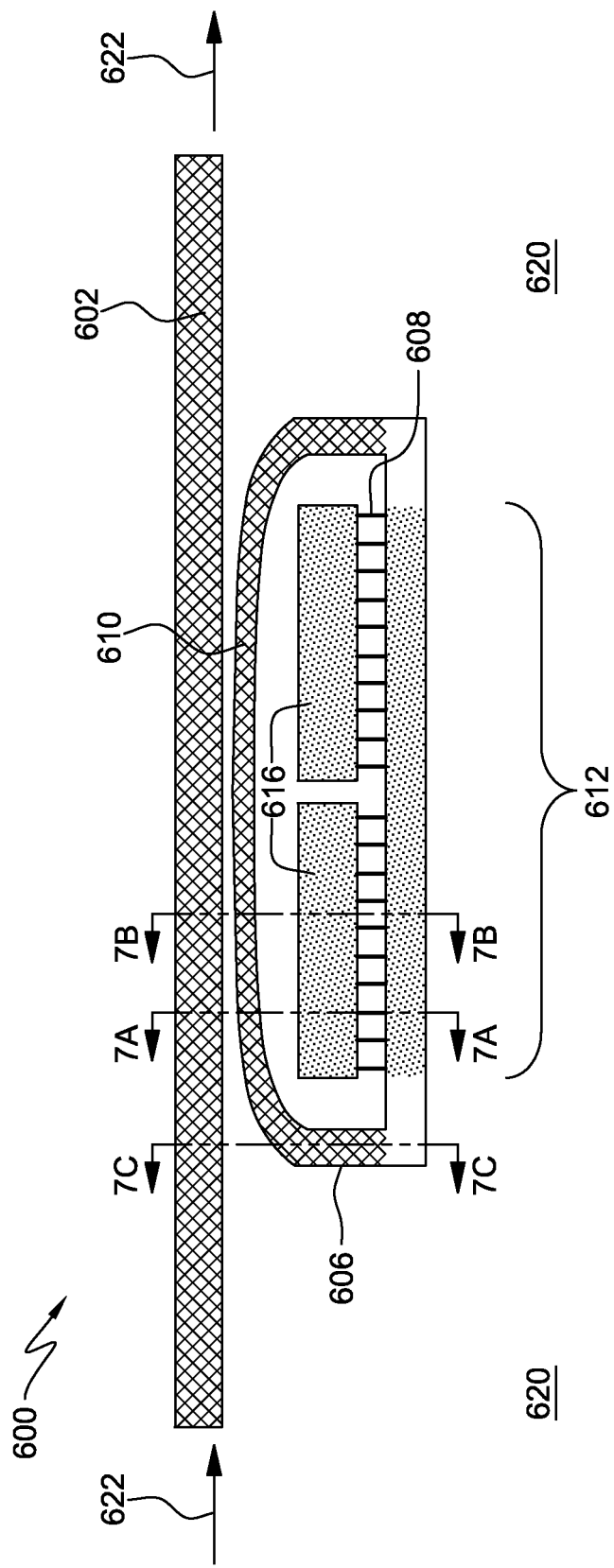
FIG. 6 is atop view of an implementation of a third exemplary embodiment.

A third implementation of an exemplary embodiment of a transparent photodetector 600 is illustrated in FIG. 6. This third implementation is similar to the first implementation in FIG. 3 except that there may be a second material utilized for the waveguide 602 and transparent section 610.

Silicon is not transparent to all wavelengths that one may want to detect. Hence, a two-material implementation of the exemplary embodiments may be of interest. The second material is shown cross-hatched in FIG. 6. The second material may be used for the waveguide 602 and the transparent section 610 of the displaceable structure 606. Examples of a useful second material may be undoped silicon nitride, silicon carbide, silicon dioxide, and aluminum oxide. Other materials are possible as well. In the third exemplary embodiment, the nanowire array 608 and the transparent section 610 may be on the same plane to maximize nanowire strain detection by minimizing torque bending nanowires out of plane. If the second material is of a different thickness than the silicon used for the nanowire array 608, an appropriate height offset may be planned to center the opto-mechanical force in the transparent section 610 on the plane defined by the nanowire array 608.

The contacts 616 and conductive section 612 are shaded to indicate that they may be doped. Each nanowire in the nanowire array 608 may have at least one undoped or low-doped segment along its length to allow for large piezoresistance.

The transparent photodetector 600 may be fabricated on an SOI substrate 620 and include a second material as indicated above. FIGS. 7A, 7B and 7C are various cross sections of transparent photodetector 600 as indicated by arrows 7A-7A, 7B-7B and 7C-7C in FIG. 6. Referring first to FIG. 7A, this is a section through the conductive section 612, nanowire array 608, contacts 616, transparent section 610 and waveguide 602. FIG. 7B is a section through the conductive section 612, contacts 616, transparent section 610 and waveguide 602 while FIG. 7C is a section through the displaceable structure 606 and waveguide 602.

SOI substrate 620 includes the base substrate 632, BOX layer 634 and SOI layer 636. The displaceable structure 606, including transparent section 610 and conductive section 612, and silicon nanowire arrays 608 may be suspended by removing the BOX layer 634 underneath the SOI layer 636. The displaceable structure 606 and silicon nanowire arrays 608 are indirectly connected to the substrate 620 through contacts 616 which make direct physical contact with BOX layer 634. The waveguide 602 is also not suspended and is directly physically connected to the substrate 620 at BOX layer 634.

The waveguide 602 and transparent section 610 may be made of the second material and preferably are on the same plane as conductive section 612, nanowire array 608 and contacts 616 as can be seen in FIGS. 7A and 7B. At the side of the transparent beam 606, as shown in FIG. 7C, there may be an overlap of the material (for example, silicon) 640 of the SOI layer 636 and, the second material 642.

In operation, a light 622 is caused to travel through the waveguide 602 and interact with the transparent section 610 of the displaceable structure 606. In this exemplary embodiment, the traveling light 622 causes a force on the displaceable structure 606 which in turn causes a strain on the silicon nanowire arrays 608. Due to the enhanced piezoelectric effect in the silicon nanowire arrays 608, the change in resistance of the silicon nanowire arrays 608 may be measured by applying a voltage and measuring the output current. In this exemplary embodiment, the current may be measured between two contacts 616 as it passes through the nanowire arrays 608 and conductive section 612. The output current will be related to the intensity of the traveling light 622 in the waveguide 602. Thus, the transparent photodetector 600 may be used as a photodetector.

The exemplary embodiments may be manufactured according to conventional semiconductor manufacturing practices following the teachings herein.

There are a number of design considerations for the exemplary embodiments of the transparent photodetector. Among these design considerations are energy efficiency, detection bandwidth, nanowire orientation and typical dimensions.

Energy Efficiency:

Material loss, scattering loss and work performed by guided light are all considerations to minimize optical loss and hence maximize the energy efficiency of the photodetector. A preferred embodiment will maximize energy efficiency.

Material Loss

The materials used for the waveguide and for the transparent section of the displaceable structure that is exposed to a non-negligible amount of light from the evanescent tail of the guided mode in the waveguide need to show low material absorption. Examples of such materials are silicon, silicon nitride, silicon oxide, silicon oxinitride, and silicon carbide.

Scattering Loss

Scattering by the transparent section of the displaceable structure of the optical power guided in the waveguide can be reduced to a negligible level if the displaceable structure is smoothly (and preferably adiabatically) approaching the waveguide on both edges. In addition, the transparent section of the displaceable structure in the sensing region (region defined by sufficient proximity of the waveguide to the transparent section of the displaceable structure for generation of optical forces) should preferably be of dimensions as not to support a guided mode by itself. If it does, significant amount of light may be coupled from the waveguide to the displaceable structure. It is preferable for the displaceable structure to only introduce a perturbation to the mode of the waveguide without supporting a guided mode by itself as this ensures that light will not be coupled to the displaceable structure. It is also preferable for the composite waveguide in the sensing region (formed by the combination of the waveguide and the displaceable structure) not to support higher order modes than the modes of the waveguide itself (far from the sensing region). Imperfections in the structure may couple light to higher order modes which are then lost to radiation. The non-existence of these modes can prohibit this from happening and remove a possible source of loss. Of particular importance are higher modes of the polarization that the waveguide is expected to carry. Not allowing these modes to appear in the sensing region (combined waveguide) will contribute to energy efficiency.

Work Performed by Guided Light

To detect the optical signal, the guided light in the waveguide must apply a force on the displaceable structure. This force is then transmitted to the nanowires. This force must introduce a strain in the nanowires in order to modulate the output current via piezoresistance. Work is defined as the force times the displacement. To minimize the amount of work performed by the optical signal (energy lost to detection) one must ensure the displaceable structure is of as high stiffness as possible and the nanowires are as short as possible. Short nanowires and stiff displaceable structure will ensure small beam displacement under the applied force by the optical signal. This will result in a small amount of performed. Work and, thus, negligible absorption of photons.

Detection Bandwidth:

The detection bandwidth will be limited by the resonant frequency of the mechanical resonator formed by the combination of the nanowires and the displaceable structure. The larger the stiffness and the smaller the mass, the larger the resonant frequency is. Resonance enhancement is not required for signal detection. Hence, it will likely be preferable to use as large a nanowire-array stiffness as possible to set the mechanical resonant frequency substantially above the modulation frequency of the signal to be detected. This requirement is consistent with the requirement of high stiffness for minimization of work performed by guided light to optimize energy efficiency. In practice, the high stiffness can be achieved by using more nanowires in the nanowire array. The larger the stiffness, however, the larger the needed optical force to induce a detectable strain in the nanowires. This can be somewhat compensated with a larger sensing region.

Nanowire Orientation:

Piezoresistance in silicon nanowires is a function of the crystal orientation the nanowire surfaces. Any crystallographic orientation will work but the preferred embodiment will use nanowires with large {110} surfaces. This can be obtained on a common <100> wafer by aligning the nanowires along or at 90 degrees to the <110> direction. The nanowire sidewalls will then be {110} oriented. If the nanowire cross-section is tall and narrow, the piezoresistance of the nanowires will be dominated by the {110} sidewalls which will result in a large detection signal.

Typical Dimensions:

Nanowire width and/or height: 5-500 nm
Nanowire length: 5-5000 nm
Bandwidth of the detected signal: <200 GHz.

The dimensions of the displaceable structure and waveguide depend on the materials used. A typical silicon waveguide used for 1550 nm light would show height and width in the 30-1000 nm range.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A transparent photodetector comprising:
a substrate;
a waveguide for guiding a light on the substrate;
a displaceable structure that can move with respect to the substrate and is in proximity to the waveguide, the displaceable structure including a transparent section for interacting with the light guided by the waveguide and a conductive section in rigid connection with the transparent section; and
a silicon nanowire array suspended with respect to the substrate and electrically connected to the conductive section of the displaceable structure, the silicon nanowire array comprising a plurality of silicon nanowires having piezoresistance;
the substrate, waveguide, displaceable structure and silicon nanowire array forming the transparent photodetector;
wherein, in operation, light propagating in the waveguide results in an optical force on the displaceable structure which further results in a strain on the nanowires to cause a change in electrical resistance of the nanowires.

2. The transparent photodetector of claim 1 further comprising contacts affixed to the substrate and connected to the silicon nanowire array.

3. The transparent photodetector of claim 1 wherein upon application of a voltage to the silicon nanowire array, a current is measured which changes according to a change in the electrical resistance of the nanowires.

4. The transparent photodetector of claim 1 wherein each nanowire has at least one doped segment along its length.

5. The transparent photodetector of claim 1 wherein the conductive section is proximate the transparent section and the silicon nanowire array extends from the conductive section and away from the transparent section.

6. The transparent photodetector of claim 1 wherein the conductive section is spaced from the transparent section and the silicon nanowire array and the contacts are between the transparent section and the conductive section.

7. The transparent photodetector of claim 1 wherein the transparent section and waveguide comprise a first material and the conductive section comprises a second material, the first material being different from the second material.

8. A transparent photodetector comprising:
a silicon on insulator (SOI) substrate comprising a semiconductor on insulator (SOI) layer, an oxide layer, and a base;
a waveguide for guiding a light formed in the SOI layer;
a displaceable structure in proximity to the waveguide, the displaceable structure formed in the SOI layer with the oxide layer removed from underneath the displaceable structure so that the displaceable structure is suspended with respect to the SOI substrate, the displaceable structure including a transparent section for interacting with the light guided by the waveguide and a conductive section in rigid connection with the transparent section; and
a silicon nanowire array in the SOI layer suspended with respect to the base by the removal of the oxide layer underneath the silicon nanowire array and electrically connected to the conductive section of the displaceable structure, the silicon nanowire array comprising a plurality of silicon nanowires having piezoresistance;
the substrate, waveguide, displaceable structure and silicon nanowire array forming the transparent photodetector;
wherein, in operation, a light source propagating through the waveguide results in an optical force on the displaceable structure which further results in a strain on the nanowires to cause a change in electrical resistance of the nanowires.

9. The transparent photodetector of claim 8 wherein upon application of a voltage to the silicon nanowire array, a current is measured which changes according to a change in the electrical resistance of the nanowires.

10. The transparent photodetector of claim 8 wherein each nanowire has at least one doped segment along its length.

11. The transparent photodetector of claim 8 wherein the SOI layer further includes at least one dopant selected from the group consisting of germanium, arsenic, phosphorus, boron, antimony and carbon.

12. The transparent photodetector of claim 8 further comprising contacts in the SOI layer and connected to the silicon nanowire array, wherein the transparent section and conductive section form an enclosure with the contacts and silicon nanowire array within the enclosure.

13. The transparent photodetector of claim 8 further comprising contacts in the SOI layer and connected to the silicon nanowire array, wherein the conductive section extends outwardly from the transparent section and the contacts and silicon nanowire array are proximate to the conductive section.

14. The transparent photodetector of claim 8 wherein the transparent section and waveguide comprise a second material that is different from the material of the SOI layer.

15. The transparent photodetector of claim 14 wherein the second material is selected from the group consisting of silicon nitride, silicon carbide, silicon dioxide, and aluminum oxide.

16. The transparent photodetector of claim 8 further comprising contacts in the SOI layer and connected to the silicon nanowire array.

17. The transparent photodetector of claim 16 wherein the transparent section and waveguide comprise a second material that is different from the material of the SOI layer.

18. The transparent photodetector of claim 17 wherein the second material is selected from the group consisting of silicon nitride, silicon carbide, silicon dioxide, and aluminum oxide.

* * * * *